Figure 1:
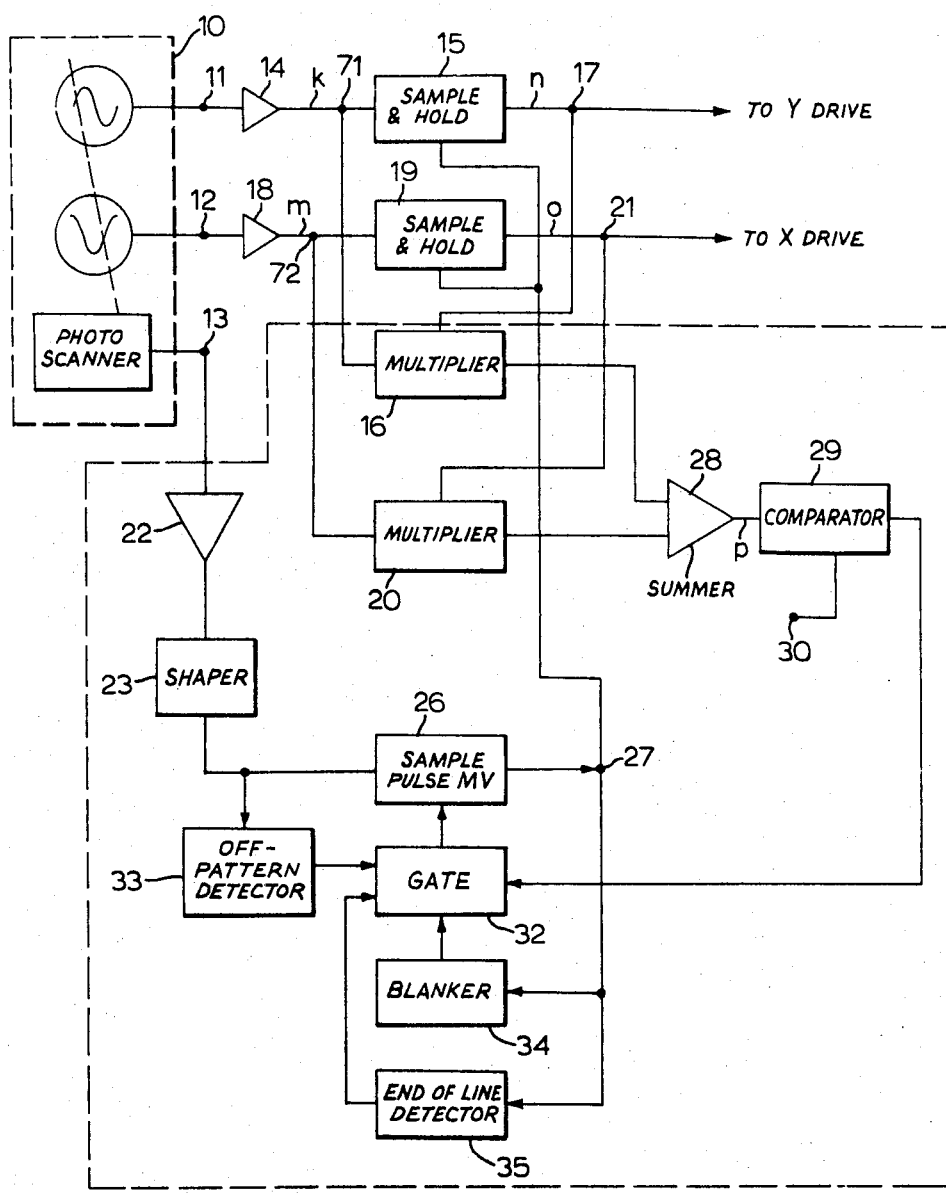

United States Patent [19]
Murphy et al.

[11] 3,883,735
[45] May 13, 1975

[54] LINE TRACER
[75] Inventors: Francis P. Murphy, Hamilton, Ontario; Robert E. Parker, Dundas, Ontario, both of Canada
[73] Assignee: Westinghouse Canada Limited, Hamilton, Ontario, Canada
[22] Filed: Dec. 26, 1973
[21] Appl. No.: 430,916

[52] U.S. Cl................................ 250/202; 318/577
[51] Int. Cl. ........................................... G05b 1/00
[58] Field of Search.................. 250/202; 340/172.5; 235/198; 318/162, 566, 567, 577; 178/6.8

[56] References Cited
UNITED STATES PATENTS

| | | | |
|---|---|---|---|
| 2,974,254 | 3/1961 | Fitzmaurice | 250/202 |
| 3,004,166 | 10/1961 | Greene | 318/577 |
| 3,015,730 | 1/1962 | Johnson | 250/202 |
| 3,289,004 | 11/1966 | Greanias | 250/202 |
| 3,529,084 | 9/1970 | Rich | 250/202 |
| 3,597,619 | 8/1971 | Little | 250/202 |

Primary Examiner—James W. Lawrence
Assistant Examiner—D. C. Nelms
Attorney, Agent, or Firm—Westinghouse Canada Limited

[57] ABSTRACT

A line tracing system having provision for memory function to enable it to cross inadvertent or intentional gaps in the line and maintain the same direction. In addition, the system can identify the end of a line and stop or reverse as desired. By utilizing co-ordinate direction, information from the drawing and from the tracing head a gating signal is produced which is continuously directed in the forward direction in which tracing is to take place.

6 Claims, 5 Drawing Figures

LINE TRACER

This invention relates to optical pattern tracing controls and in particular, to controls of the type which repetitively scan the pattern to be followed in a circular manner, derive a signal from such scanning operation and utilize the signal to control coordinate drive motors.

There are various types of optical pattern tracing machine control systems including scanning and non-scanning tracing heads, friction and coordinate drive machines, edge and line tracers. This invention has particular application to a pattern tracer of the circular scanning type for operation with a coordinate drive system which may be used for either line or edge tracing.

By a circular scanning tracer is meant a tracer which views the pattern in such a manner that the point observed by the tracing head is caused to rotate repetitively so as to describe a circular path on the surface bearing the pattern when the head is stationary. Naturally, when the head is in translational motion, the point scanned by the tracing head will more closely approach an epicycle.

The detector in the tracing head is arranged to produce a signal indicative of a change in illumination of the detector. In this way, the device may operate either as a line tracer, i.e., a tracer of a narrow mark on a surface area, or as an edge tracer, i.e., a tracer of the transition from a reflective to a less reflective area as in the case when the pattern is a silhouette. The signal representing this transition is then processed and used to control a pair of motors which, when associated with suitable machinery, will cause the tracing head and related machine tool to move in a plane in accordance with the pattern as controlled by the motors.

It will be appreciated that when, in accordance with general practice in this field, the convolutions performed by the tracing head are similarly performed by the machine tool which may, for example, be a cutting torch and in this way the material to be cut will be shaped into the same form as the pattern being traced by the tracing head.

In circular scanning tracing heads it is necessary to correlate the signal produced by the scanning head with information indicating the instantaneous direction of the scanning point.

In the prior art this reference information has been generated as sinusoidal information as for example, in the tracing head described in Canadian Application Ser. No. 065,212, Robert E. Parker et al., allowed May 2, 1972, or in U.S. Pat. No. 3,395,282, issued July 30, 1968.

Because the scanner creates two pulses for each circular scan, one representing the forward direction of the line and one representing the reverse direction of the line, it is necessary to differentiate between these two pulses so that the tracer can continue to trace forward and not trace the reverse direction. Methods have been proposed to attain this end by inhibiting the rear pulse. In Canadian Pat. Application No. 103,940, filed Jan. 29, 1971, William Dell et al, a memory circuit is introduced which permits the machine to continue operating in a particular direction in the absence of a line, to prevent inadvertent reversal in the presence of unintended breaks in the line or in the presence of intentional breaks in the line which are required for other purposes.

The present system describes an improved memory which eliminates the necessity for maintaining the scanning frequency constant, thus permitting the scanning head to operate at a variable frequency which may be desirable under some circumstances.

In the past, it has also been suggested that auxiliary marks on the pattern may be used to control the various functions of the machine. Such command marks, as they are termed, have been previously referred to in Canadian Pat. Application Ser. No. 103,940. The present system provides an improved means of detecting such command marks and permits the utilization of command marks of a type different from those previously usable.

The system as described is based on transistor transistor logic integrated circuits. Detailed circuit diagrams of the integrated circuits will not be provided since each block as designated is commercially available as a functioning unit and the user of such devices need only provide the circuitry shown in the diagrams. Various symbolic representations will be used for the integrated circuits in accordance with common practice.

It will also be understood that in the following description of this invention no attempt will be made to describe a complete system since such systems have been described in the prior art in particular in the applications referred to above. It will be assumed that a suitable scanning device is provided which will produce the desired signals for example the scanning device shown in U.S. Pat. No. 3,395,282. In addition, it will be assumed that the signals such as the on-pattern signal, the X output and the Y output will all be properly utilized to control the necessary X drive unit and Y drive unit to cause the suitable coordinate motion of the machine in a manner well known.

Figure 2:
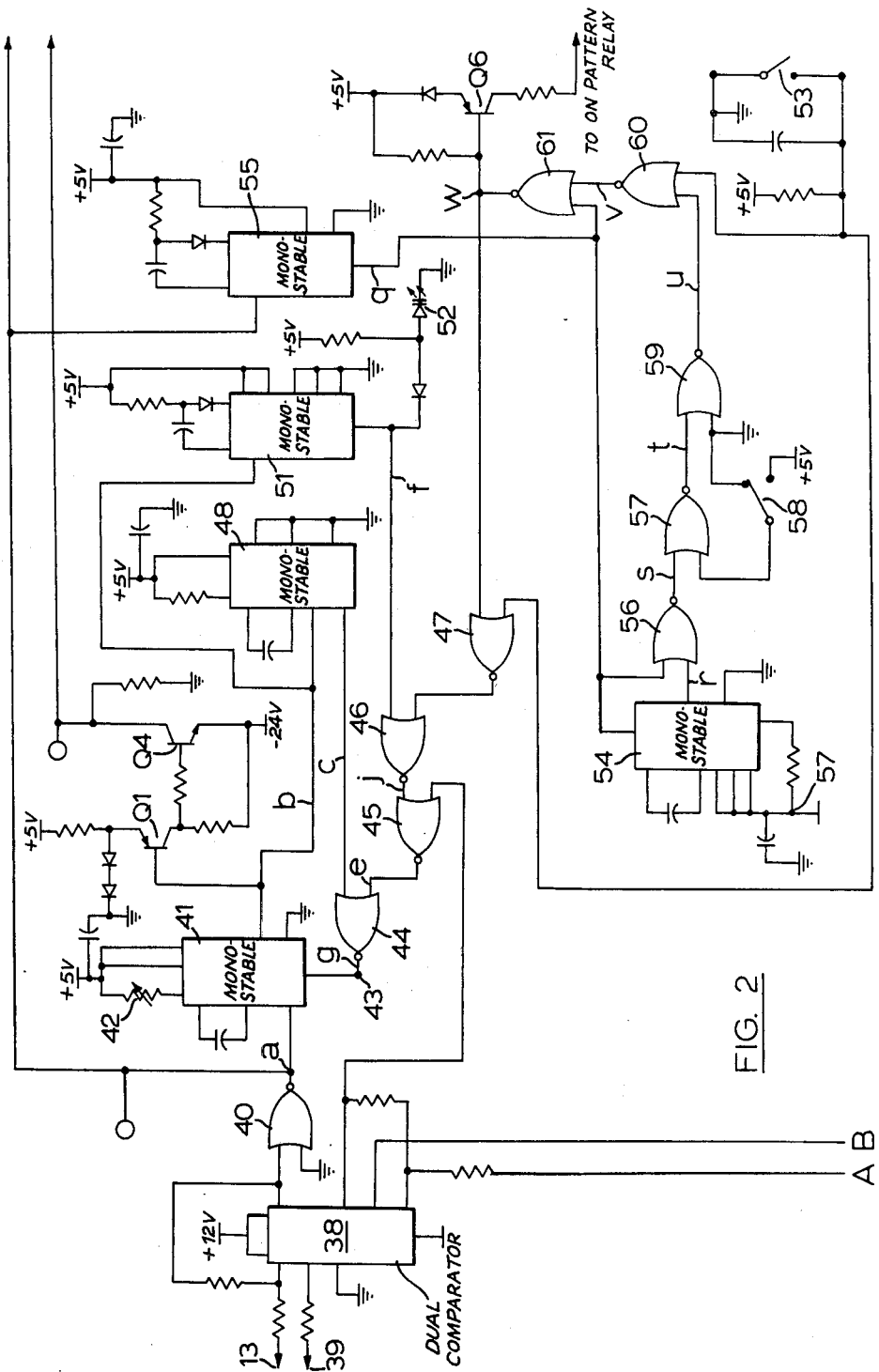
Figure 2A:
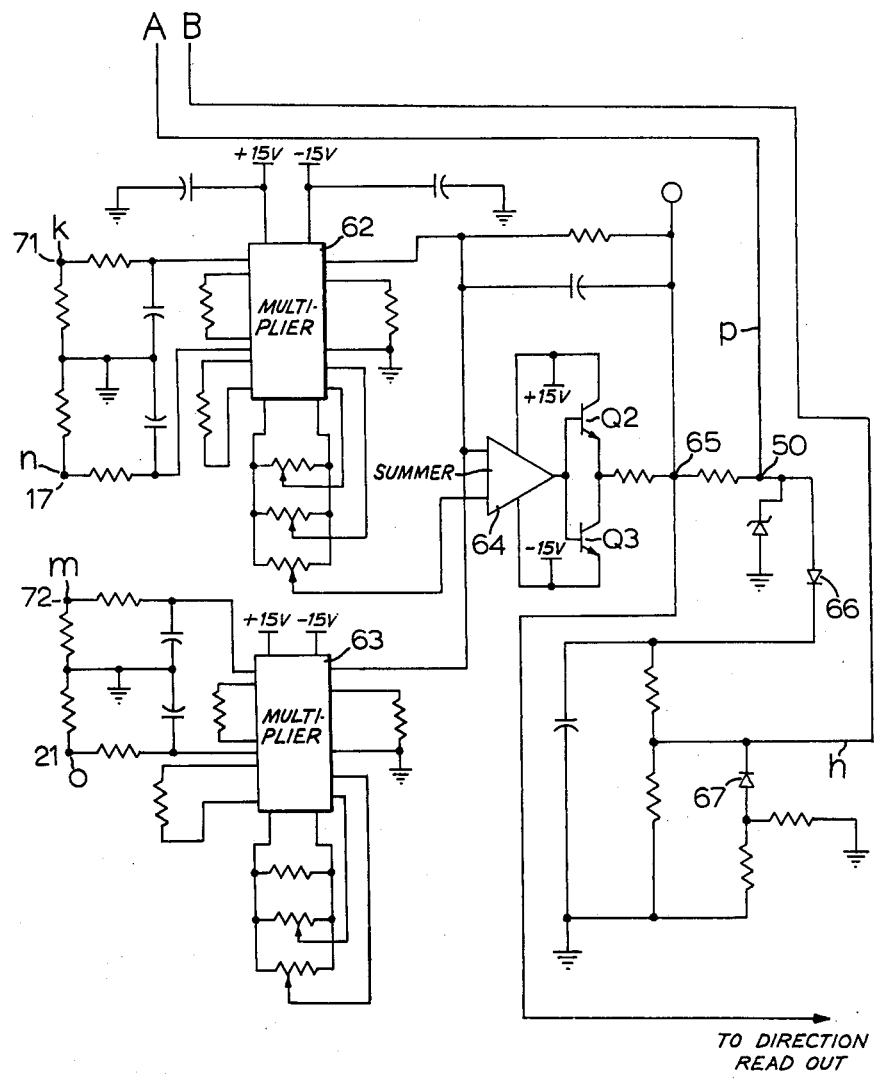
Figure 3:
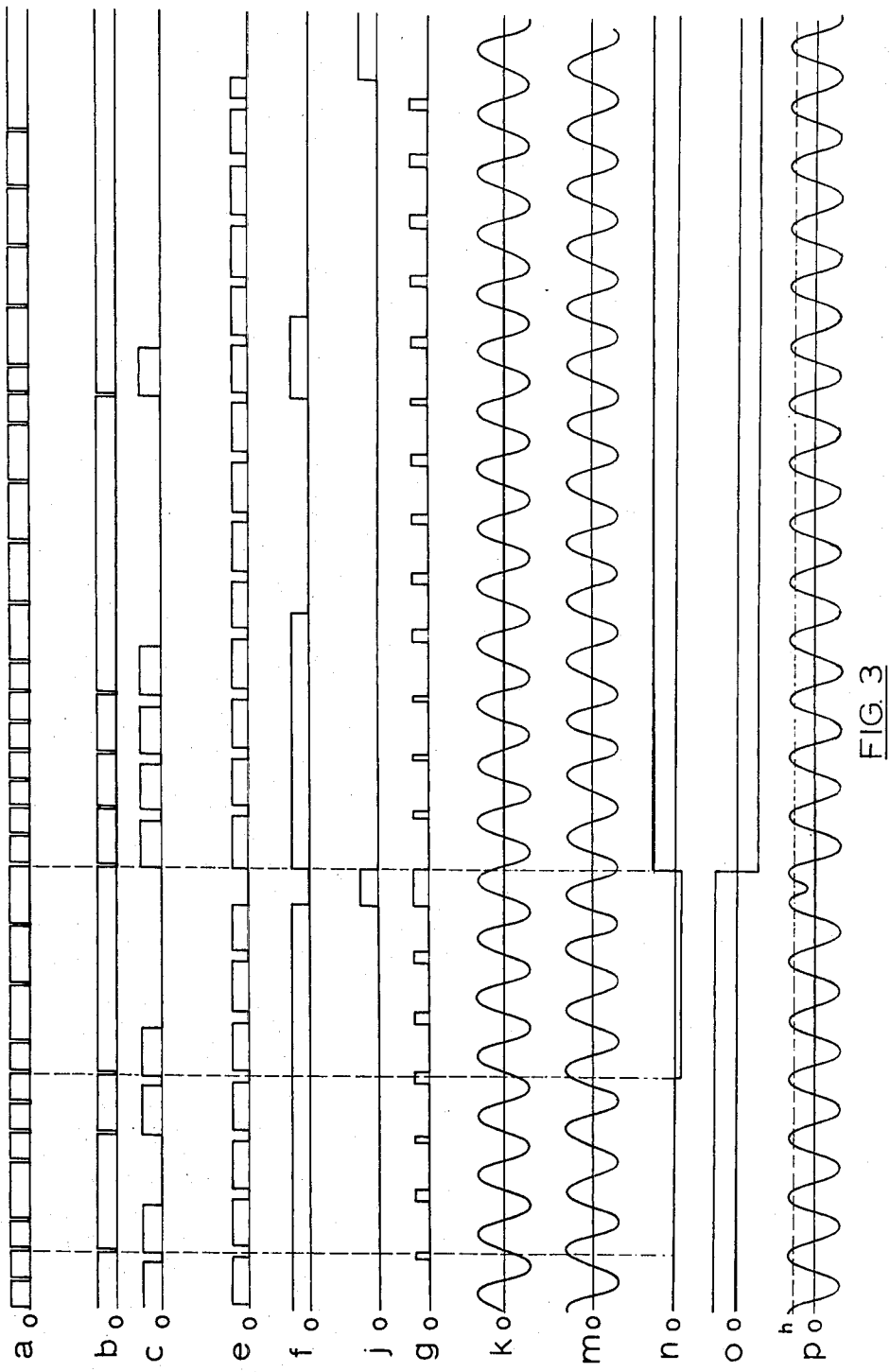
Figure 3A:
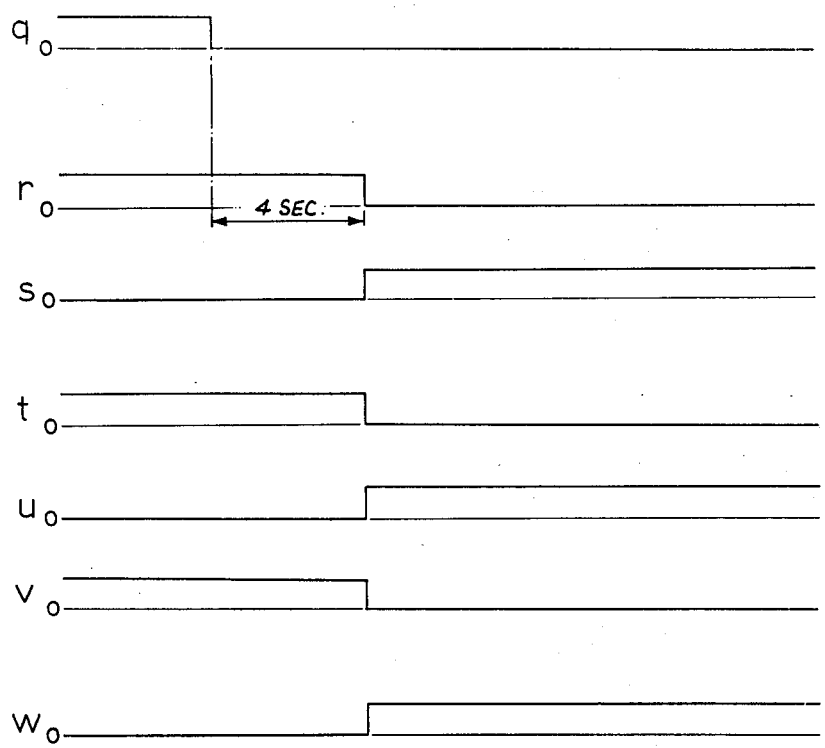

A clearer understanding of our invention may be had from consideration of the following description and drawings in which:

FIG. 1 is a block diagram of the system in accordance with our invention;

FIGS. 2 and 2a together form a detailed circuit diagram of a portion of the system of FIG. 1;

FIGS. 3 and 3a illustrate a series of waveforms useful in explaining the operation of the system.

Considering first FIG. 1, there is shown a circular scanner designated 10 which has three outputs; one on terminal 11, which is a sine wave; one on terminal 12 which is a cosine wave and one on terminal 13 which is a pulse which is the output from the photo electric device which indicates the relative position of the line.

The output from terminal 11 is applied to buffer amplifier 14 and from thence to the sample-and-hold circuit 15 and the multiplier 16. The output from the sample-and-hold circuit 15 is applied to terminal 17 which is the input to the Y drive amplifier. The output from terminal 12 is similarly applied to amplifier 18 and from thence to the sample-and-hold circuit 19 and to the multiplier 20. The output from the sample-and-hold circuit 19 is applied to terminal 21 which is the input to the X drive amplifier. The output from terminal 13 is applied to voltage amplifier 22, shaper 23 and to the sample pulse generator 26. The sample pulse generated by the sample pulse generator 26, is applied to both sample-and-hold circuits 15 and 19 from its output terminal 27. The outputs from multipliers 16 and 20 are applied to the summer 28 and the output from the summer applied to the comparator 29. Also applied to the comparator 29 is a reference voltage applied to terminal 30. The output from the comparator is applied to gate 32. Also applied to gate 32 is the output from the off-pattern detector 33 which derives its input from shaper 23 and the output from the blanker 34 which derives its input from terminal 27 as does the end of line detector 35 whose output similarly is applied to gate 32. The output from the gate 32 is applied to the sample pulse multivibrator to control its operation.

GENERAL DESCRIPTION OF OPERATION

Before proceeding with any more detailed description of the circuits used, I shall describe in general terms the system operation. The rotational scanner 10 produces sinusoidal outputs at terminals 11 and 12 and these waves are applied to the sample-and-hold circuits 15 and 19. The pulse output from the scanner appearing on terminal 13 is processed to produce a sampling pulse coincident in time with the scanning of the line. This sampling pulse is used to operate the sample-and-hold circuits so that each circuit 15 and 19 produces a voltage output proportional to the amplitude of the wave applied to its input at the time determined by the time of occurrence of the sampling pulse on terminal 27. The voltages so produced are used to control the X and Y drive amplifiers.

The system as described this far will cause the X and Y amplifiers to drive the tracing head in such a direction as to keep the scanner over the line. The remainder of the circuit is required to provide certain auxiliary controls and to overcome certain disadvantages which will become evident. For example, in order that the tracer proceeds in one direction there must be means provided for differentiating between the front pulse and the rear pulse, that is the pulse produced as a scanner scans the line ahead in the direction in which the scanner is travelling from the pulse produced when the scanner crosses the line behind in its direction of travel.

This differentiation is supplied by gate 32 which inhibits the sample pulse multivibrator during a certain period and prevents the rear pulse from producing a sample pulse. This function is provided primarily by blanker 34 which generates a blanking pulse in response to a sample pulse and this blanking pulse has a duration representing more than 180° of the scanner rotation. However, in the presence of an interruption in the line, either intentional or accidental, no sample pulse will be provided on the forward scan and hence the blanker will not be operated until the next pulse is received which may well be the reverse pulse thus causing the machine to reverse direction and trace in the opposite direction. In order to overcome the problem, or if desirable permit such mode of operation, an auxiliary blanking pulse is developed from elements 16, 20, 28 and 29.

Let us now consider FIGS. 2 and 2a which comprise a detailed circuit diagram of that portion of FIG. 1 within the dotted line in the lower portion. The scanning pulse from the photo scanner appears at terminal 13 and is applied to the upper portion of a dual comparator designated 38 which stabilized its level by means of a level input signal on terminal 39. The output is inverted by the nor gate 40. This output of the form as shown at a in FIG. 3 is applied to the sample pulse generator which comprises monostable 41 and its associated circuitry which is arranged to operate on a negative edge. The width of the pulse produced is determined by the adjustment of resistor 42. Transistors Q1 and Q4 are used merely to amplify the output and convert it into a negative going 24 volt pulse. The monostable is also under the control of the potential applied to terminal 43 and this must be held positive before the monostable will trigger.

Terminal 43 is the output of gate 32 in FIG. 1 and the gate 32 consists of a series of nor circuits 44, 45, 46 and 47. It will be seen that nor gate 44 derives its input from the blanker 34 which comprises the monostable 48 and its associated circuitry. This monostable is triggered by the output from monostable 41 and has an output of the form shown at c in FIG. 3 producing a positive going pulse beginning at the negative edge of the pulse shown at b in FIG. 3 and continuing for a predetermined number of miliseconds, equal to approximately 300° of revolution of the scanner. A further input to nor gate 44 is derived from nor gate 45. One of the inputs to nor gate 45 is derived from the lower portion of dual comparator 38 corresponding to comparator 29 in FIG. 1. This comparator stabilizes a blanking signal derived from terminal 50 of the blanker generator corresponding to elements 16, 20 and 28 of FIG. 1. Another input into nor gate 45 is derived from nor gate 46 which has two inputs, one from the end of line detector 35 which has a form as shown at f in FIG. 3. It derives its input from the output of monostable 41 and remains in a positive state until 45 milliseconds after the arrival of the last pulse from monostable 41. Therefore under normal conditions when a line is present under the photocell and the scanner is rotating pulses will be produced at such a rate that the output from the end of line detector 51 is kept positive.

The presence of this positive voltage on the output of the end of line detector will also cause the LED 52 to be illuminated which indicates the presence of a line and is helpful during servicing of the equipment. Another input to the nor gate 46 is the output from nor gate 47. Nor gate 47 receives one input from the memory switch 53 which in its open position applied 5 volts to the input of the nor gate 47 but in its closed position grounds the input. A further input to nor gate 47 is derived from the offpattern detector designated 33 in FIG. 1 which consists of monostable 55 and other associated components.

Monostable 55 is driven by the output from nor circuit 40 and is arranged to remain in its unstable condition as long as pulses are received indicating the presence of a line. In the absence of such pulses, the monostable reverts to its stable condition causing its output, which is applied to the monostable 54 and to nor gate 56, to go to 0.

Monostable 54 acts as a pulse stretcher and when the output from monostable 55 goes to 0 in the absence of input pulses, the output from monostable 54 goes to 0 a certain time later determined by the voltage applied to terminal 57. This may be set to a particular voltage to produce a delay of say four seconds, at which time the input to nor gate 56 goes to 0 and with both inputs 0 the output goes to 1.

The output from nor gate 56 goes to nor gate 57. The other input to nor gate 57 is from switch 58 which may apply 5 volts to the input or ground depending on the position of the switch 58. With the switch in the lower position, the output of nor gate 57 is always 0. With the switch in the upper position, the output goes to 1 when the output of nor gate 56 is 0. The output from nor gate 57 is applied to nor gate 59 which, because one terminal is grounded, goes to 1 when the output from nor gate 57 is 0. The output from nor gate 59 is applied to nor gate 60. The other terminal of nor gate 60 is connected to the memory switch 53 which may apply 5 volts to this terminal or ground depending on the condition of the switch. With the switch 53 open the output of nor gate 60 is always 0. When the switch 53 is closed, the output of nor gate 60 goes to 1 when the output from nor gate 59 is 0. The output from nor gate 60 is applied to nor gate 61. The other input to nor gate 61 is derived from monostable 55. As long as the output from monostable 55 is 1, the output from nor gate 61 is 0. When the output from monostable 55 is 0 the output from nor gate 61 goes to 1 when the output of nor gate 60 is 0. The output from nor gate 61 is applied through transistor Q6 to the on-pattern relay normally holding the relay in until the output of nor gate 61 is 1 which indicates on absence of the line either immediately or after a suitable delay depending on the condition of various preceding nor switches in the memory circuits. The output from nor gate 61 is also applied to nor gate 47. As shown in FIG. 1, this is the output from the offpattern detector 33 which is applied to gate 32.

The direction resolving circuit will now be described. It consists of a pair of multipliers 62 and 63. To the input of 62 is applied a signal from terminal 11 after amplifying by the buffer 14 and also an output from terminal 17. These two functions are multiplied together in the multiplier and are applied to the summer which includes the operational amplifier 64. Also applied to the operational amplifier 64 is the output of multiplier 63 which has two inputs corresponding to the inputs of multiplier 62 except they represent the co-sine information from terminal 21 and buffer 18. The output from the operational amplifier 64 is applied to a pair of transistors Q2 and Q3 and the output appears at terminal 65.

The two inputs to one of the multipliers are $6 \cos(\omega t+\alpha)$ and $10 \cos \theta$. The multiplier combines these two inputs. The input to the other multiplier is $6 \sin(\omega t+\alpha)$ and $10 \sin \theta$. The two outputs are combined in the summer to produce $- [6 \cos(\omega t+\alpha)] [10 \cos \theta] - [6 \sin(\omega t+\alpha)][10 \sin \theta]$ which equals $60 \cos(\omega t+\alpha-\phi)$.

An examination of this expression indicates that it represents a sine wave whose frequency is that of the scanner and whose phase is a function of the rotational position of the scanner $\alpha$ and the direction of the line $\theta$. The positive peak of this waveform always corresponds to the anticipated position of the next front pulse. This waveform is the waveform shown at p in FIG. 3 and when clipped produces the waveform as shown at e in FIG. 3. The resultant clipped wave, which always represents the same number of degrees of rotation width, and is centered in the direction of the line, is applied to nor gate 45.

The reference voltage applied to the comparator 38 is derived from terminal 50 by rectification through diode 66 and stabilization by means of various components including diode 67 so as to represent a constant fraction of the maximum sinusoidal amplitude.

OPERATION

As previously described, the pulses from the photoscanner are processed and if a line is present the pulses are available to drive the blanker 48 which produces a waveform as shown at c in FIG. 3. Each one of the positive going pulses has a time duration equal to approximately 300° of scanner rotation. Therefore the next negative going portion of the pulse occurs approximately 60° before the occurrence of the next forward pulse produced by the line, assuming that the line is straight. If the line is not straight, the next line pulse may occur in the position other than 60° from the preceding pulse; however it will normally appear somewhere during the occurrence of the negative going portion of the pulse. When the pulse occurs it drives monostable 48 into its unstable condition where it once more remains for 300°, whereupon it reverts to its stable negative state. The negative pulses so produced are inverted by nor gate 44 and appear at terminal 43 in a positive sense and enables the trigger 41 to be triggered by the next occurence of the line pulse. However, in the absence of a pulse to trigger blanker 48 back to its unstable state, the output from nor gate 45 may be critical since monostable 41 will remain receptive.

Disregarding the upper input to nor gate 45 it will be seen that the blanking pulse from dual comparator 38 is applied to nor gate 45 and has the form as shown at e in FIG. 3. This gate always occurs irrespective of the presence or absence of pulses from monostable 41 and represents a time period which would normally span the next front pulse. If the blanker 48 remains in its negative state, the pulse from the dual comparator, which is negative going at the input of nor gate 44, causes a positive pulse at terminal 43 thus enabling the trigger 41.

In order for the gate from the dual comparator to be effective the upper terminal of nor gate 45 must be negative thus creating a negative pulse at its output when the lower terminal goes positive. In order for this upper terminal on nor gate 45 to be negative, one of the inputs to nor gate 46 must be positive. As long as a line is present the end of the line detector 51 produces an output of the positive form and this output remains positive for 45 milliseconds after the last received pulse. This causes LED 52 to be illuminated which indicates the presence of a line being scanned and also holds the upper terminal of nor gate 46 positive.

Considering the lower terminal of nor gate 46 this will stay positive unless one of the inputs to nor gate 47 is positive. It will be seen that the lower terminal of nor gate 47 is supplied with a positive voltage as long as the memory switch is open. Therefore the output from nor gate 47 remains positive if the memory switch is closed as long as the upper terminal of nor gate 47 is negative.

Let us now examine the condition of the upper terminal of nor gate 47. This is controlled from the output of nor gate 61 which responds to a series of nor gates referred to as the off-pattern drive shut-down logic. The first element in this shut-down logic is the monostable 54 which changes state to produce zero output a fixed time after its input from monostable 55 goes to zero. As long as there are pulses present due to the tracing of the line the lead off-pattern detector monostable 55 produces a positive output. However, in the absence of a line there is no output from monostable 55. The monostable 54 stays in its positive output condition for a time determined by the voltage on terminal 57 and then reverts to its negative output condition. When both inputs to the terminal of nor gate 56 are negative, the output is positive. The output from the nor gate 56 when applied to the nor gate 57 may determine the output. For example, if the switch 58 is in its lower position a positive potential is applied to the lower terminal of nor gate 57 and irrespective of the potential applied to the upper terminal a 0 output is derived from the nor gate. However, when the switch 58 is in its upper position, a 0 voltage is applied to nor gate 57 and the output of the nor gate will be positive as long as the input to the upper terminal is negative. When both the inputs to nor gate 59 are zero there is a positive output but since the lower terminal is grounded this serves to invert the input. With both the inputs negative to nor gate 60, one from the memory switch and one from nor gate 59, the output from nor gate 60 is positive. The output from nor gate 60 is applied to nor gate 61. When both outputs to nor gate 61 are negative its output is positive cutting off the Q6 and turning off the on-pattern relay and also applying a positive potential to the upper terminal of nor gate 47. In other words the positive potential is applied to terminal 47 only after the pulse stretcher monostable 54 has timed out at which time if the memory switch is closed the output from monostable 47 goes negative. Hence, it may be assumed that the blanking pulses will be supplied to the trigger 41 for four seconds, which enables the machine to continue in its normal direction for four seconds as long as the memory switch is on. If there is still no line after that period, the pulse stretcher 54 will time out causing the off on-pattern relay to drop out. If the memory switch is off, the absence of a line will result in the 300° blanker being driven by the back pulse, causing the machine to reverse direction.

A clearer understanding of the operation of the system may be had by an examination of the various waveforms in FIG. 3 which are identified by letter designations which correspond to letter designations on the drawings. The first portion of the waveforms corresponds to a period in which a line is being traced. The next succeeding portion indicates a portion of the operation when a pulse is inadvertently missed. The next portion indicates the operation when there is an interruption in the line and the memory is off. The next portion shows the situation which occurs at a break in the line when the memory is on. FIG 3a shows the sequence of events when the line ends and the memory is on.

It will be noted that the time delay of monostable 54 is determined by the voltage applied to terminal 57. If this voltage is made proportional to speed, that is the tangential velocity of the tracer, then shut-off will always occur a set distance after detection of off-pattern by monostable 55.

It will be understood that while this invention has been described in its preferred embodiment using integrated circuits, it will be evident to those skilled in the art that it should, be designed to use discrete components or similar integrated devices performing corresponding functions.

The embodiments of the invention in which an exclusive property or privilege is claimed are defined as follows:

1. A circular scanning line tracer including optical means to scan an illuminated pattern and produce a train of pulses in accordance with the front and rear crossing of the line by the scan, a pair of sinusoidal reference signals phase related to the rotational position of the scan, means comprising gating means for selecting from said train of pulses those pulses indicative of the front crossing of the line by the scan, means to utilize the pulses so selected to sample said sinusoidal reference signals and produce co-ordinate signals representative of the direction of the line relative to the rotational position of the scan, means to combine said coordinate signals with said sinusoidal signals to produce a directional sinusoid of constant amplitude with phase representative of the direction of the line and means to derive from said directional sinusoid, a gating signal to control said gating means.

2. A circular scanning line tracer as claimed in claim 1 wherein said pair of sinusoidal reference signals comprise a sine wave and a cosine wave signal.

3. A circular scanning line tracer as claimed in claim 1 wherein said gating signal continues to be produced in the same phase with reference to the rotational position of the scan even in the absences of one or more pulses from said train of pulses.

4. A circular scanning line tracer as claimed in claim 3 wherein said gating signal continues to be produced for a selectable period of time.

5. A circular scanning line tracer as claimed in claim 1 including means to detect the end of a line and means to stop further tracing a predetermined period of time after detection of the end of the line.

6. A circular scanning line tracer as claimed in claim 1 having a first gating signal derived from said selected pulses and a second gating signal derived from said directional sinusoid and means to utilize said first gating signal to enable selection of pulses from said train of pulses when a line has been scanned and to utilize said second gating signal to enable selection of pulses after the absence of a scanned line.

* * * * *